US005339506A

United States Patent [19]

Nusz

[11] Patent Number: 5,339,506

[45] Date of Patent: Aug. 23, 1994

[54] OVERHEAD CAM LIFTER REMOVAL TOOL

[76] Inventor: John A. Nusz, E. 2206 Parfreyville Rd., Waupaca, Wis. 54981

[21] Appl. No.: 99,467

[22] Filed: Jul. 30, 1993

[51] Int. Cl.$^{5}$ ............ B23P 19/04

[52] U.S. Cl. ............ 29/252

[58] Field of Search ............ 29/252, 213.1, 214, 29/263, 264, 265

[56] References Cited

U.S. PATENT DOCUMENTS

| | | | |
|---|---|---|---|
| 2,365,023 | 12/1944 | Taylor | 29/214 |
| 3,479,722 | 11/1969 | Maness | 29/213.1 |
| 3,681,838 | 8/1972 | Tutino | 29/213.1 |
| 4,562,629 | 1/1986 | Cerio | 29/213.1 |
| 4,586,229 | 5/1986 | Pendola | 29/252 |
| 4,681,139 | 7/1987 | Falconer | 29/213.1 |
| 4,787,130 | 11/1988 | Hale et al. | 29/252 |
| 4,912,825 | 4/1990 | Policella | 29/214 |
| 5,117,864 | 6/1992 | Byers | 29/213.1 |

*Primary Examiner*—Robert C. Watson
*Attorney, Agent, or Firm*—E. Michael Combs

[57] ABSTRACT

A fitting arranged to direct fluid into a cylinder head bore to effect freeing of a cam shaft lifter therefrom is provided, such that the tool structure includes a central body having a conical externally threaded shank arranged for reception within the cylinder head opening arranged to direct fluid through the body of the associated fluid fitting. A modification of the invention includes a second body rotatably mounted relative to the first body, with the second body having a projecting shaft cooperating with a collet member having a collet conical bore, wherein the conical bore includes a conical expansion wedge to secure the second body relative to the first body and within the cylinder head.

2 Claims, 4 Drawing Sheets

OVERHEAD CAM LIFTER REMOVAL TOOL

BACKGROUND OF THE INVENTION

1. Field of the Invention

The field of invention relates to cam shaft lifter removal tool structure, and more particularly pertains to a new and improved overhead cam lifter removal tool arranged to effect fluid pressurizing of a passage to effect directing a lifter from an associated cylinder head body.

2. Description of the Prior Art

Cam shaft lifting structure is indicated in the prior art such as indicated in the U.S. Pat. Nos. 3,479,722; 3,681,838; and 4,912,825.

The instant invention attempts to overcome deficiencies of the prior art by providing for a lifter tool removal structure wherein the same is arranged for fluid filling of a cam lifter conduit and bore to effect projection of a cam lifter therefrom and in this respect, the present invention substantially fulfills this need.

SUMMARY OF THE INVENTION

In view of the foregoing disadvantages inherent in the known types of overhead cam lifter removal tools now present in the prior art, the present invention provides an overhead cam lifter removal tool wherein the same is arranged to effect fluid pressurized filling of a cylinder head opening bore within an associated cylinder head. As such, the general purpose of the present invention, which will be described subsequently in greater detail, is to provide a new and improved overhead cam lifter removal tool which has all the advantages of the prior art cam lifter removal tool structure and none of the disadvantages.

To attain this, the present invention provides a fitting arranged to direct fluid into a cylinder head bore to effect freeing of a cam shaft lifter therefrom, such that the tool structure includes a central body having a conical externally threaded shank arranged for reception within the cylinder head opening arranged to direct fluid through the body of the associated fluid fitting. A modification of the invention includes a second body rotatably mounted relative to the first body, with the second body having a projecting shaft cooperating with a collet member having a collet conical bore, wherein the conical bore includes a conical expansion wedge to secure the second body relative to the first body and within the cylinder head.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved overhead cam lifter removal tool which has all the advantages of the prior art cam lifter tools and none of the disadvantages.

It is another object of the present invention to provide a new and improved overhead cam lifter removal tool which may be easily and efficiently manufactured and marketed.

It is a further obit of the present invention to provide a new and improved overhead cam lifter removal tool which is of a durable and reliable construction.

An even further object of the present invention is to provide a new and improved overhead cam lifter removal tool which is susceptible of a low cost of manufacture with regard to both materials and labor, and which accordingly is then susceptible of low prices of sale to the consuming public, thereby making such overhead cam lifter removal tools economically available to the buying public.

Still yet another object of the present invention is to provide a new and improved overhead cam lifter removal tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
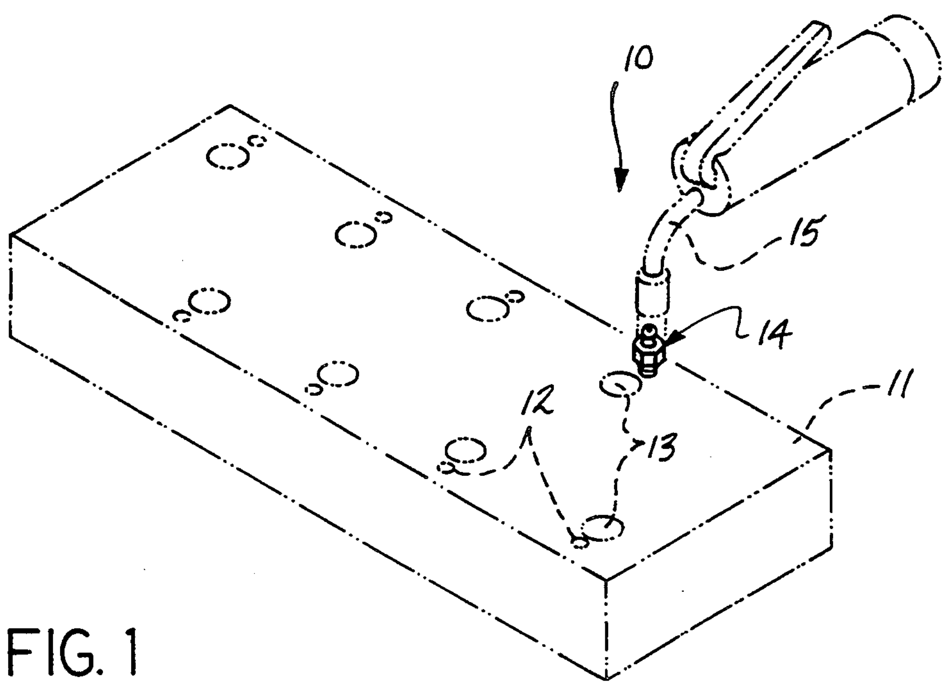
FIG. 1 is an isometric illustration of the invention in use.
Figure 2:
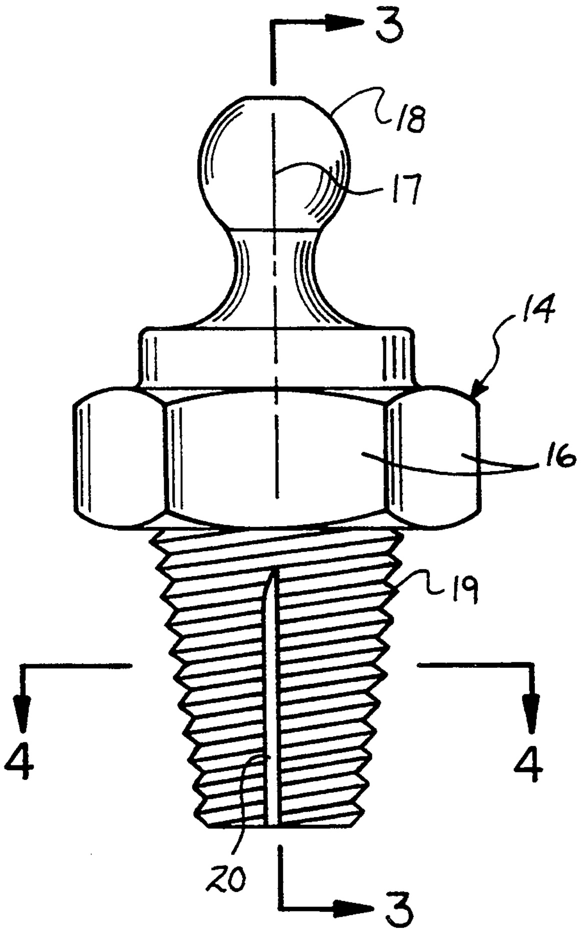
FIG. 2 is an orthographic side view of a first embodiment of the fitting structure of the invention.

With reference now to the drawings, and in particular to FIGS. 1 to 8 thereof, a new and improved overhead cam lifter removal tool embodying the principles and concepts of the present invention and generally designated by the reference numeral 10 will be described.

Figure 3:
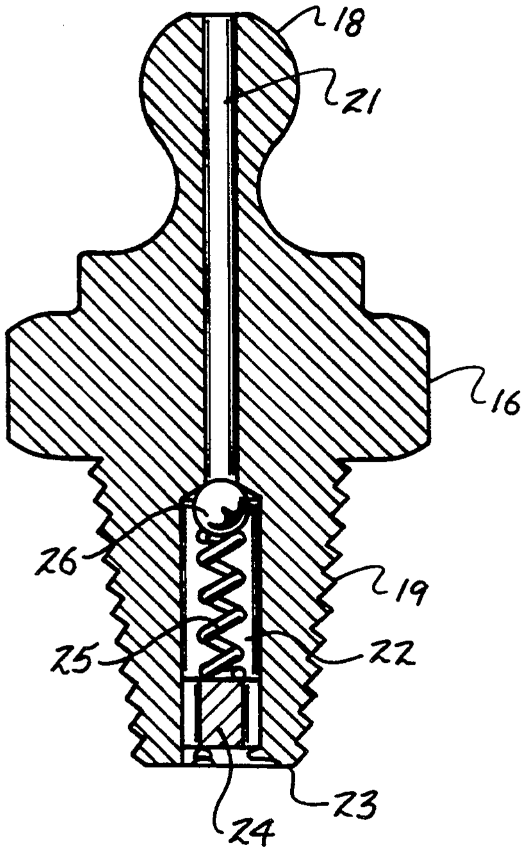
FIG. 3 is an orthographic view, taken along the lines 3—3 of FIG. 2 in the direction indicated by the arrows.
Figure 4:
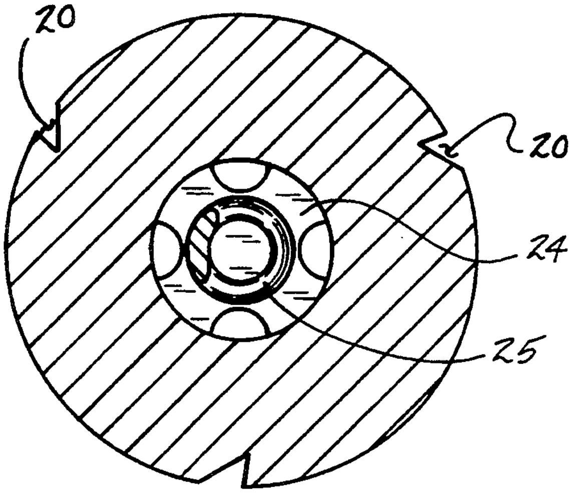
FIG. 4 is an orthographic view, taken along the lines 4—4 of FIG. 2 in the direction indicated by the arrows.

More specifically, the overhead cam lifter removal tool 10 of the instant invention is essentially arranged for cooperation with a cylinder head 11, as indicated in FIG. 1, with the cylinder having a cylinder head opening 12 in fluid communication with a lifter bore 13 such that a fitting 14 directed into the opening 12 effects pressurizing and removal of a lifter contained within a lifter bore 13. The fitting 14 is arranged to receive a grease hose 15 to effect pressurizing of the opening 12. The fitting 14 includes side wall wrench flats 16 symmetrical about an axis 17, having a head 18 and a conical externally threaded shank 19, having relief slots 20 for self-tapping threading within the opening 12. Reference to FIG. 3 indicates a first bore extending from the head, having a first diameter in communication with a second bore 22, having a second diameter greater than the first diameter. The shank 19 includes a bottom wall 23 having the second bore extending therethrough, such that an apertured floor web 24 is mounted within the second bore in adjacency to the bottom wall 23. A second bore spring 25 is captured between the floor web 24 and the first bore 21, having a check ball 26 mounted to the second bore spring 25 in communication with the first bore, such that pressurizing the first bore displaces the check ball against the spring to direct fluid through the second bore 22 and the apertured web 24.

Figure 5:
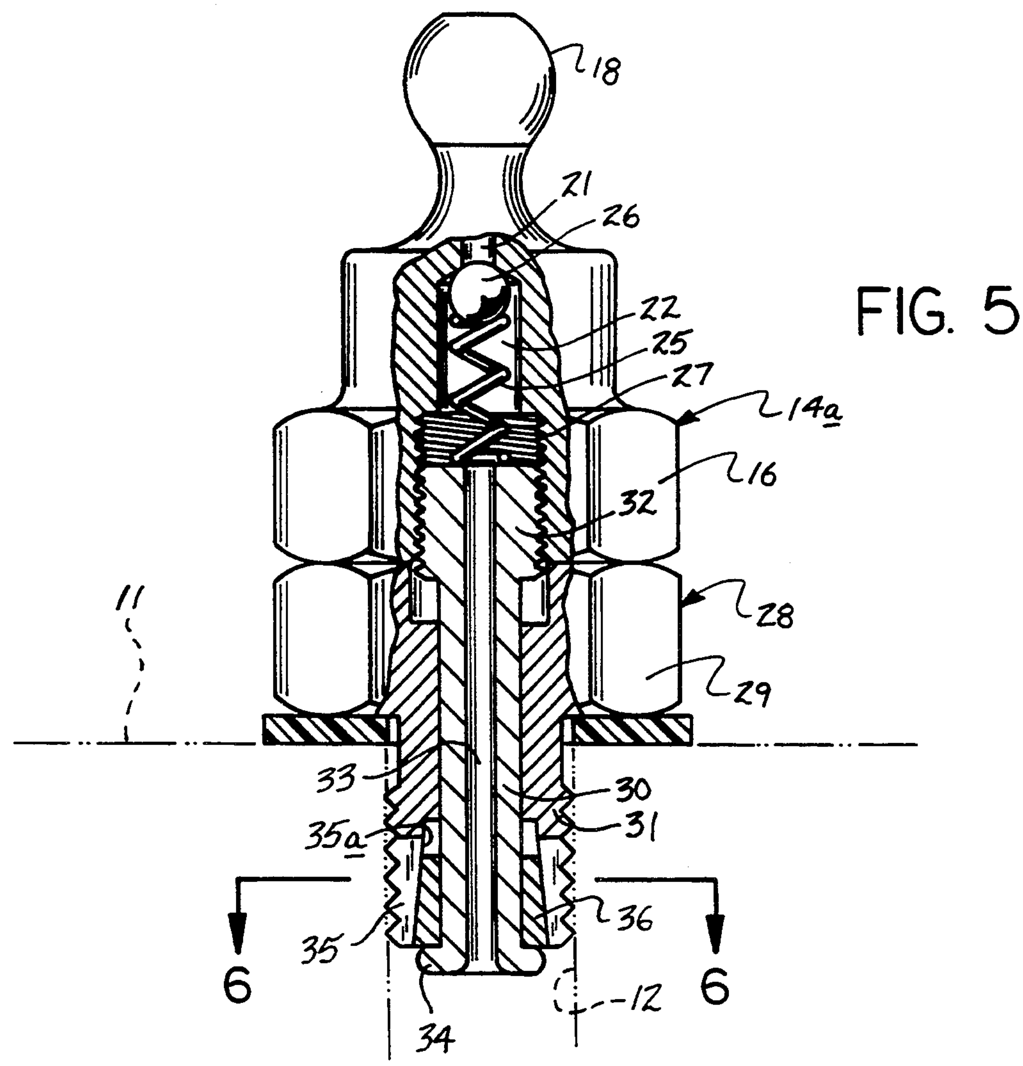
FIG. 5 is an isometric illustration of a modified aspect of the invention.
Figure 6:
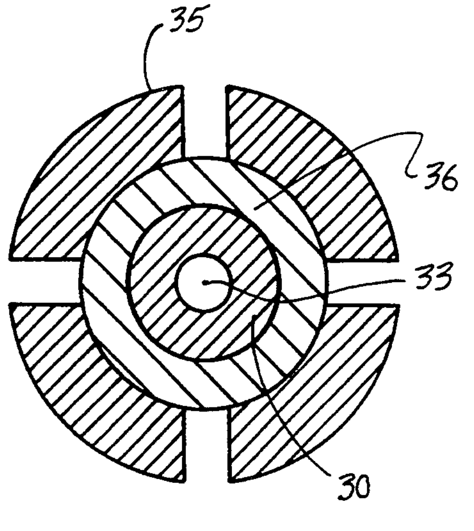
FIG. 6 is an orthographic view, taken along the lines 6—6 of FIG. 5 in the direction indicated by the arrows.
Figure 7:
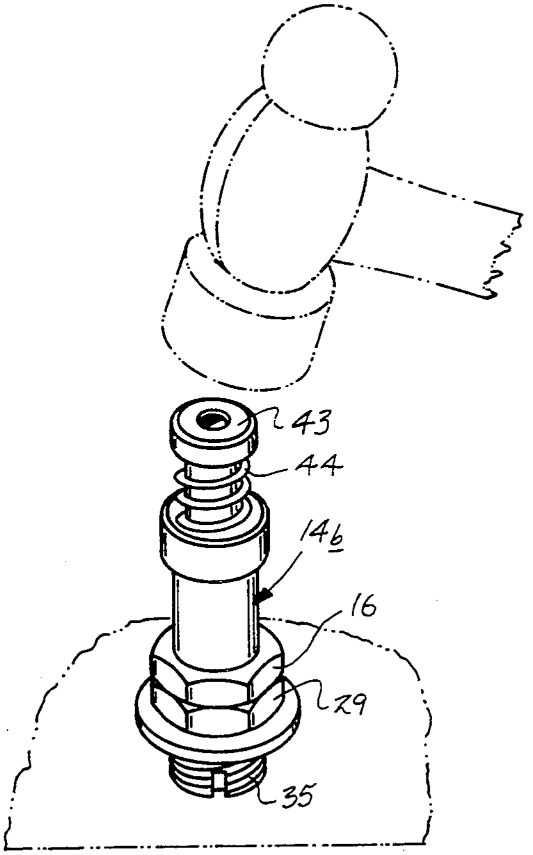
FIG. 7 is an isometric illustration of a further modified aspect of the invention in use.
Figure 8:
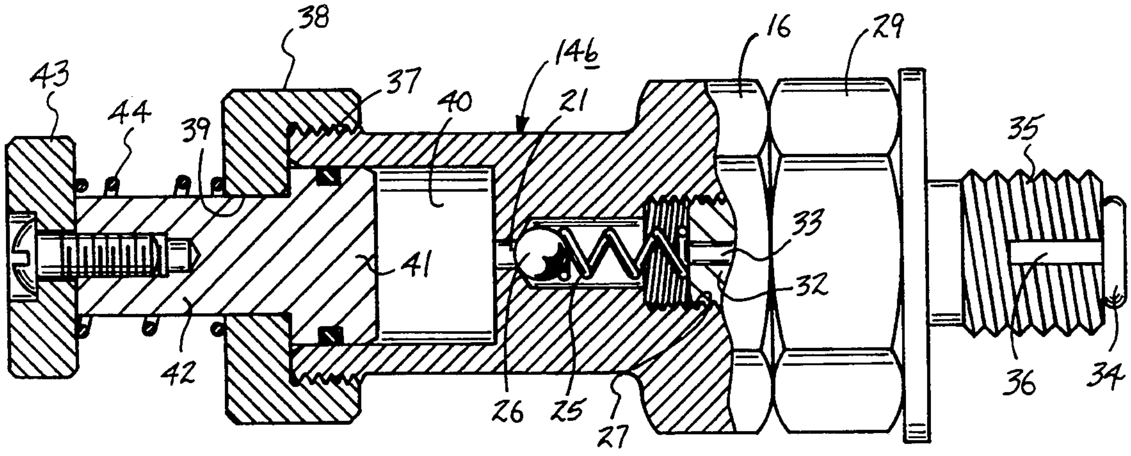
FIG. 8 is an enlarged orthographic view, partially in cross-section, of the tool structure as indicated in FIG. 7.

The FIGS. 5 and 6 include a modified tool structure having a first body 14*a* cooperating with a second body 28. A third bore 27, as illustrated, extends from the second bore 22 through the second body. Second body wrench flats 29 are arranged for cooperation rotatably relative to the wrench flats 16, whereupon the second body wrench flats 29 are maintained in a stationary orientation, while the first wrench flats 16 are rotated. A central core 30 having a central core head 32 is threadedly received within the internally threaded third bore with the central core 30 frictionally and rotatably received through a second body projecting shaft 31 projecting from the second body coaxially aligned therewith with the first body such that rotation of the wrench flats 16 directs the central core head 32 into the third bore 27, whereupon continued rotation of the second wrench flats 28 directs a central core floor flange 34 to extend and project a truncated conical expander wedge 36 into a collet conical bore 35*a* of an externally threaded collet 35 to project the collet 35 into the cylinder head opening 12. A fourth bore 33 is accordingly in fluid communication with the second bore 22 through the third bore The FIGS. 7 and 8 further employs, in addition to the structure as indicated in the FIGS. 5 and 6, a first body externally threaded upper end 37 spaced from the wrench flats 16 arranged to threadedly receive an internally threaded cap 38 that includes a cap central bore 39 that slidably receives a piston shank 42, with the piston 41 received within a fluid reservoir 30 within the modified first body 14*b* to effect pressurizing of the fluid reservoir 40 and direct such fluid therefrom under pressure into the first bore 21. A piston shank head 43 includes a shank spring 44 captured between the shank head 43 and the cap 38 to maintain biasing of the piston 41 in a spaced relationship relative to the first bore 21.

In this manner, impact upon the head 43 pressurizes fluid throughout the organization to direct such fluid through the fourth bore 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An overhead cam lifter removal tool, comprising,
   a body symmetrically oriented about an axis, with a plurality of wrench flats integral with the body symmetrical about the axis, and
   the body having a body head, with the body head including a first bore directed therethrough, and a second bore in communication with the first bore, the second bore having a second diameter, the first bore having a first diameter, the second diameter greater than said first diameter, and
   a spring member mounted within the second bore, and
   a check ball mounted between the spring member and the first bore, and
   a second body, the second body having second body wrench flats positioned in rotative adjacency to the wrench flats, with a second end body projecting shaft integral with the second body extending from the second body wrench flats coaxially aligned relative to the axis, with a central core received through the projecting shaft, with the central core having a fourth bore, and the body having a third bore, with the third bore internally threaded and the central core having a central core externally threaded head received within the third bore in a threaded inter-relationship, with the spring member imposed upon the central core head, with the fourth bore directed coextensively throughout the central core, and the central core having a central floor flange, with a wedge member mounted upon the central core floor flange, with an externally threaded collet mounted surroundingly around about the wedge member, whereupon rotation of the wrench flats directs the central core head into the third bore and directs the wedge member into the collet to expand the collet.

2. A tool as set forth in claim 1 wherein the body head includes an externally threaded upper end, and the externally threaded upper end includes an internally threaded cap having a cap central bore, with the cap central bore including a piston shank slidably directed therethrough, with the body having a fluid reservoir in fluid communication with the first bore, and a piston fixedly mounted to the piston shank, with the piston received within the fluid reservoir, and a piston shank head, and a shank spring interposed between the piston shank head and the internally threaded cap to project the piston shank head from the internally threaded cap.

* * * * *